United States Patent [19]
Fredriksen et al.

[11] Patent Number: 5,029,436
[45] Date of Patent: Jul. 9, 1991

[54] AGRICULTURAL CARRIER VEHICLE

[75] Inventors: Nils Fredriksen; Heinrich Kleinemenke; Franz Heidjann, all of Harsewinkel, Fed. Rep. of Germany

[73] Assignee: Claas Ohg, Harsewinkel, Fed. Rep. of Germany

[21] Appl. No.: 502,994

[22] Filed: Mar. 30, 1990

[30] Foreign Application Priority Data

Apr. 8, 1989 [DE] Fed. Rep. of Germany ....... 3911524

[51] Int. Cl.⁵ .................... A01D 41/12; B62D 33/06
[52] U.S. Cl. ................................ 56/14.5; 56/15.6; 56/DIG. 9; 460/21; 460/119; 180/89.13
[58] Field of Search ............ 56/13.5, 14.3, 14.5, 56/14.6, 15.6, 122, DIG. 9; 460/21, 70, 59, 79, 119; 180/89.13; 280/504

[56] References Cited

U.S. PATENT DOCUMENTS

| 3,108,703 | 10/1963 | Horne et al. | 414/505 |
| 3,720,047 | 3/1973 | van der Lely | 56/15.6 |
| 3,721,077 | 3/1973 | van der Lely | 56/15.6 |
| 4,317,326 | 3/1982 | Riedinger | 56/14.6 |
| 4,421,188 | 12/1983 | Fredriksen | 180/89.13 |
| 4,427,090 | 1/1984 | Fredriksen et al. | 180/89.13 |
| 4,428,182 | 1/1984 | Allen et al. | 56/14.6 |
| 4,928,460 | 5/1990 | Bruer et al. | 56/14.6 |

FOREIGN PATENT DOCUMENTS 3024664 2/1982 Fed. Rep. of Germany.
3205748 8/1983 Fed. Rep. of Germany.

Primary Examiner—Terry Lee Melius
Attorney, Agent, or Firm—Michael J. Striker

[57] ABSTRACT

An agricultural carrier vehicle comprises a vehicle, an agricultural aggregate connectable with the vehicle, a saddle unit arranged on the vehicle, a driver's cabin, at least two clamping devices arranged for bracing the driver's cabin in two different positions, an upwardly guiding transporting device arranged so that the agricultural aggregate and the saddle unit are connectable with the transporting device.

22 Claims, 7 Drawing Sheets

AGRICULTURAL CARRIER VEHICLE

BACKGROUND OF THE INVENTION

THe present invention relates to an agricultural carrier vehicle which can be used for different operations, such as for example foreplowing, harvest threshing, etc.

Agricultural carrier vehicles of the above mentioned general type are known in the art. They can be further improved with respect to fast and reliable conversion from one operation to another, as well as in other aspects.

SUMMARY OF THE INVENTION

Accordingly, it is an object of the present invention to provide a agricultural carrier vehicle which is a further improvement over existing carrier vehicles of this type.

More particularly, it is an object of the present invention to provide an agricultural carrier vehicle which can be converted from one application to another application in a fast and reliable manner.

It is also an object of the present invention to provide an agricultural vehicle which in addition to easy and fast conversion, insures that during the use of the driver's cabin in conditions prescribed by law regulations, in each application the observation conditions remains always so good, as in tractors and self-propelling special agricultural machines such as harvester threshers, choppers and the like.

In keeping with these objects and with others which will become apparent hereinafter, one feature of the present invention resides, briefly stated, in an agricultural aggregate connectable at the front side with the vehicle, a saddle unit arranged on the vehicle and provided for further processing and/or collecting of an agricultural product, and an upwardly guiding transporting device connectable with the agricultural aggregate and the saddle unit.

When the agricultural carrier vehicle is designed in accordance with the present invention, it eliminates the disadvantages of the prior art and achieves for the objects specified hereinabove.

In accordance with another advantageous feature of the present invention, the driver's cabin is provided with an outlet, through which the transporting device can extend at least partially.

The cutout, as considered in end-side driver's cabin position, is provided in a rear region of a driver's cabin side located near the center of the vehicle.

The agricultural aggregate can be formed as an axial threshing and separating unit provided with two adjacent elevators forming the above mentioned transporting device. One of the elevators can extend through the cutout of the driver's cabin.

The agricultural aggregate can be connected with the vehicle by links. An upper link can be articulately connected centrally to the front side of the vehicle. The links in a central position of the driver's cabin can form a well known tractor rear three-point linkage.

The driver's cabin, after placing of the agricultural aggregate in the links, can be convertible from one cabin position to another cabin position.

In accordance with still another feature of the present invention, the upwardly guiding transporting device formed for example as an elevator can be located centrally on the vehicle.

The link and the cardan shaft can extend in a space between both elevators located near one another.

The saddle unit can be connected with the elevators and provided with two lateral grain receiving pockets and a cleaning device located therebetween. A harvesting product to be cleaned can be transported by the device from the elevators.

A passage connection air guiding shafts can be provided with an opening connectable through a seal with a cooler of the motor. The seal can be formed as bellows.

In accordance with a further feature of the present invention, a separating wall between the air aspirating passage and the chaff throwing hood can be pivotally arranged about a pivot point and also formed as a chaff guiding surface of the discharge hood.

The saddle unit can be connected with a bearing frame provided with hydraulically extendable supporting feet. The bearing frame can carry a transmission for driving the saddle unit, wherein the transmission can be connectable with a main drive of the vehicle through a cardan connection.

Finally, four extendable supporting feet can be hydraulically coupled for a synchronized movement. Two of these feet can be diagonally hydraulically connected in series. Their hydraulic cylinder-piston units can be dimensioned so that the ring piston surfaces of the first cylinder-piston unit are equal to the piston surfaces of the second cylinder-piston units.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
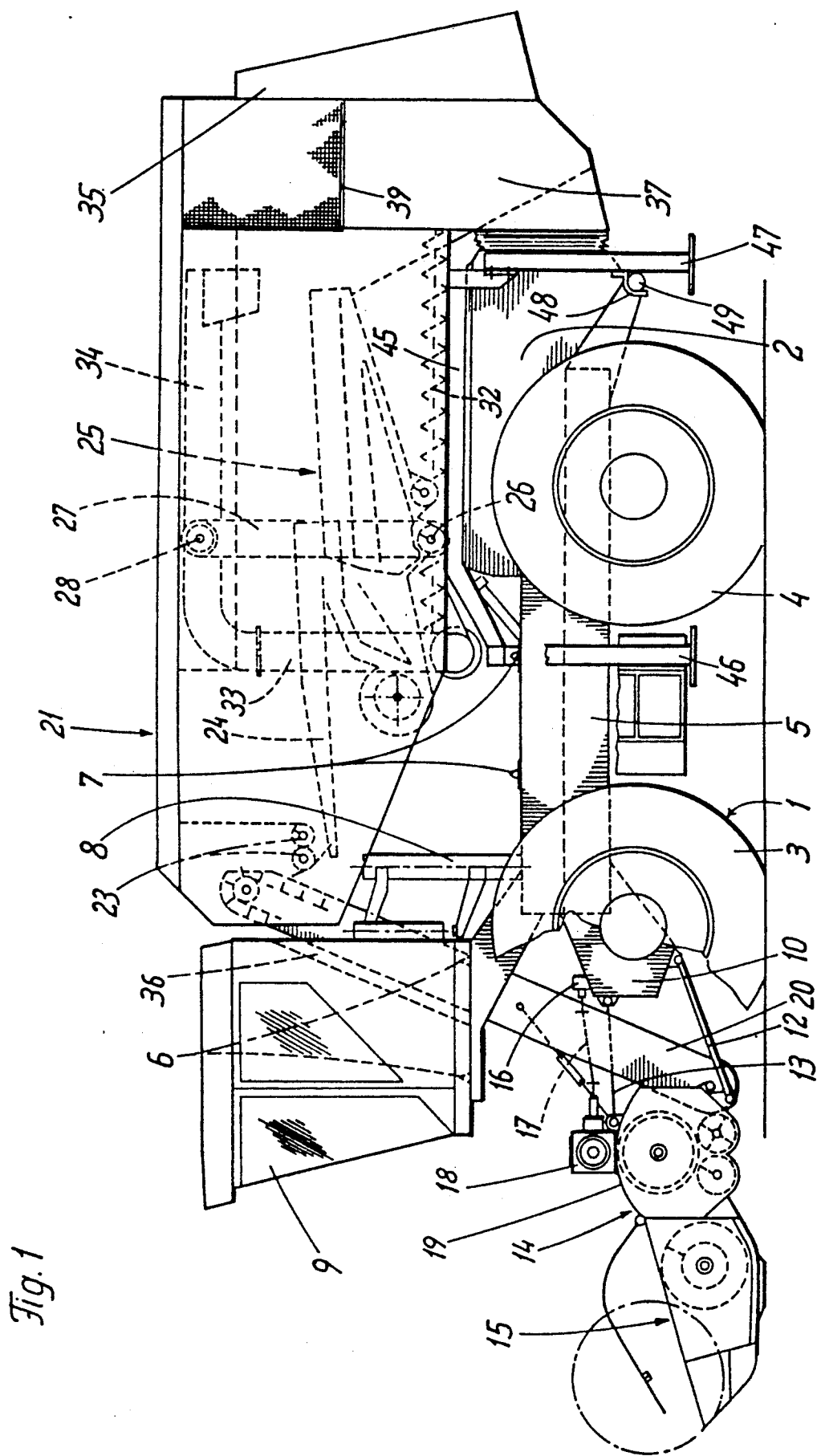
FIG. 1 is a side view of a carrier vehicle in accordance with the present invention with a front threshing unit and an installed saddle unit.

A carrier vehicle is identified as a whole with reference numeral 1. It has front stearing wheels 3 and rear wheels 4 which are driven by a motor 2. The carrier vehicle 1 has a frame 5 provided with two receiving elements 6 and 7 and a hydraulically actuatable converting device 8. By means of the converting device 8, a driver's cabin 9 can be placed in the two receiving elements 6 and 7 and locked in them. The locking is performed in a known manner which is disclosed of example in the German reference DE-OS 3,024,664.

The driver's cabin is locked with the receiving elements 7 when the carrier vehicle 1 is used as a tractor. Otherwise, the driver's cabin is locked with the receiving element 6, as shown in FIG. 1.

Figure 2:
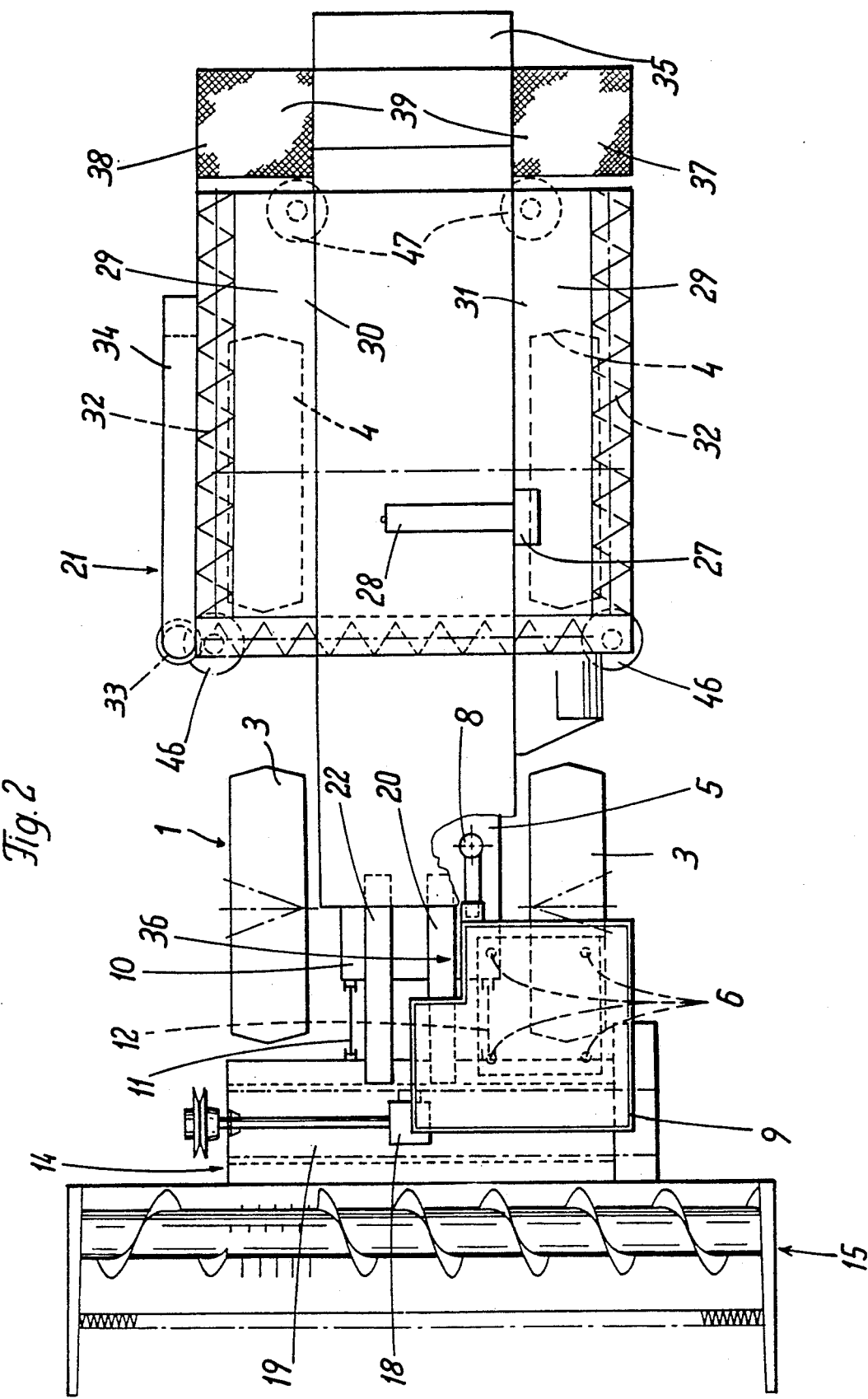
FIG. 2 is a plan view of the inventive carrier vehicle shown in FIG. 1.
Figure 3:
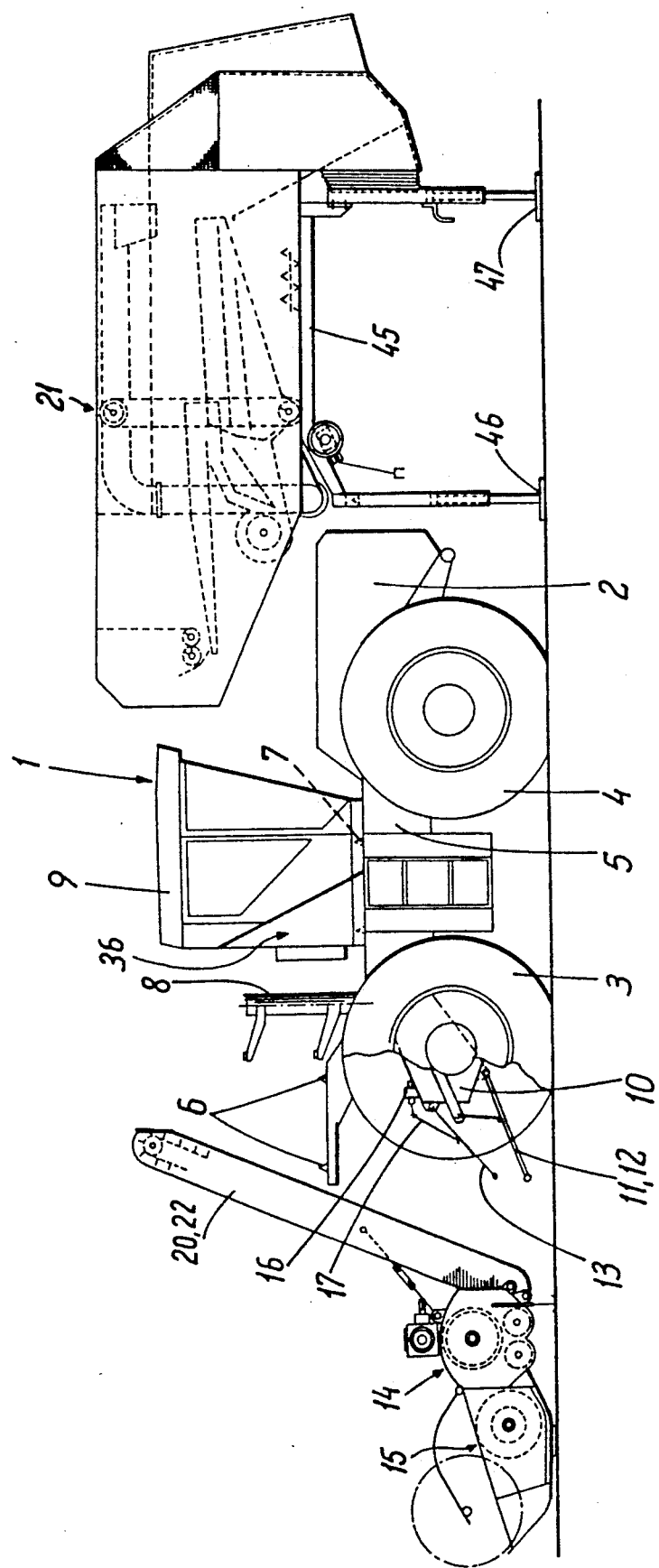
FIG. 3 is a view showing the threshing unit, the carrier vehicle and the saddle unit in a separated condition
Figure 4:
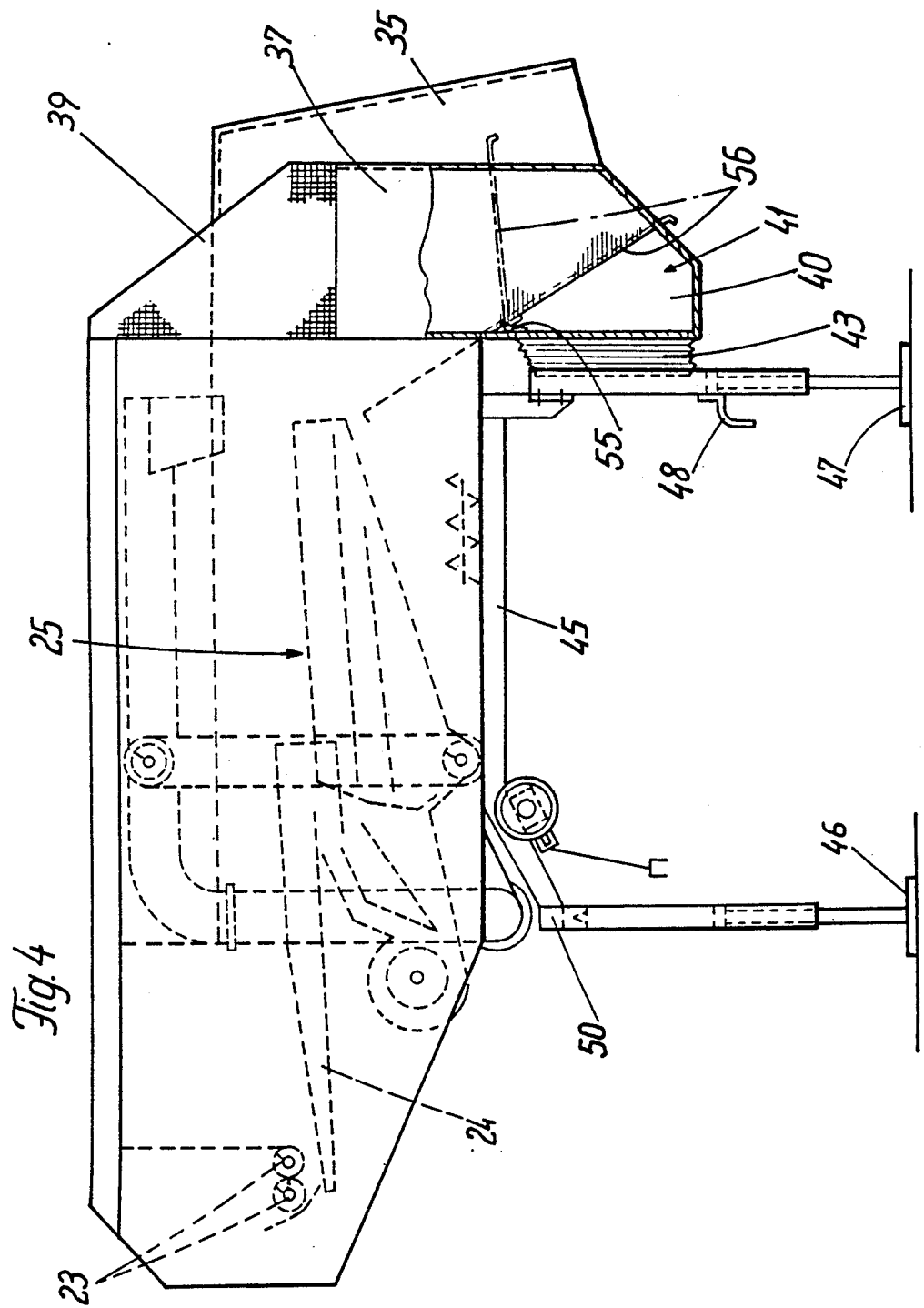
FIG. 4 is a view showing the saddle unit of FIG. 3. on an enlarged scale.

As can also be seen from FIG. 2, the frame 5 has a front console 10. An axial threshing and separating unit 14 is connected with the console 10 through two lower lateral links 11, 12 and an upper central link 13. A cutting mechanism trough 15 is connected with the axial threshing and separating unit 14. The drive of the aggregate supported by the console 10 is performed substantially by a drive unit 16 through a cardan shaft 17 and a transmission 18. The drive unit 16 is supported on the console 10, while the transmission 18 is supported on a housing 19 of the axial threshing and separating unit.

The threshed grain/chaff mixture is supplied through elevators 20 and 22 to a saddle unit 21. The elevators 20 and 22 extend parallel to one another and are located at equal distances from the longitudinal central plane of the carrier vehicle 1. The saddle unit 21 has distributing screws 23 for supplying the products uniformly to a preparation bottom 24. From there the harvested product is supplied to a wind sieve device 25 of a known construction. The cleaned grain is then transported by a transverse feeding screw 26, an elevator 27 and a further upper transverse feeding screw 28 to a known saddle tank 29 disclosed for example in U.S. Pat. No. 3,108,703. Through screws 32, vertical conveyors 33 and discharge pipe 34 the grain is withdrawn at the tank bottom in both lateral pockets 30 and 31 as known. The chaff is discharged through a central throwing hood 35 to the field.

For driving the vehicle shown in FIGS. 1 and 2 on public streets after separating only the cutting mechanism 15, the driver's cabin 9 is provided with a cutout 36 through which an elevator 20 extends. In this manner it is possible to place the driver's cabin further to the center of the carrier vehicle, so that the permissible vehicle width of 3 meter is not exceeded by the driver's cabin. Since the cutout 36 is provided in the rear region of the driver's cabin 9, the respective reduction of the interior of the cabin is not disturbing and narrowing.

As can be seen from FIGS. 1-4 the lateral pockets 30 and 31 of the saddle tank 29 are connected with shafts 37 and 38 which are rearwardly closed at all sides. The shafts 37 and 38 are provided in their upper region with sieve openings 39 through which the fresh air is supplied to the shafts 37 and 38. In this region of the agricultural machine the air is relatively free from dust and dirt. In the lower region the shafts have lateral outlet openings 40 which face toward one another. They are connected with one another through a passage 41 so that at this point no dirty air can mix with the clean air, as known in principle from the German document DE-OS 3,205,748.

One side of the passage 41 is open. This open side 42 is sealingly connected around through a bellows 43 with a cooler drill 44 of the motor. Therefore the air required for combustion of the motor 2 can be branched from here. The upper limit of the passage 41 connecting the shafts 37, 38 is formed by a flap 56 pivotally connected by a hinge 55. The flap 56 simultaneously serves as a straw conducting surface of the discharge hood 35. Due to the tiltable arrangement of the straw guiding surface, the easy access to the cooler grill for maintenance works is possible.

The saddle unit 21 is mounted on a bearing frame 45 provided with four hydraulically extendable supporting feet 46, 46a and 47, 47a. The four supporting feet are hydraulically coupled so as to run in synchronism. Each two supporting feet (47 and 46 or 47a and 46a) are connected diagonally hydraulically in series and their hydraulic cylinder-piston units are dimensioned so that the annular piston surfaces of the first cylinders 47, 47a are equal to the piston surfaces of the second cylinders 46a, 46a.

Holders 48 are welded at both rear feet 47 and 47a and engage with tubular pieces 49 connected rearwardly with the frame 5 of the carrier vehicle 1. Both front feet 46 and 46a are connected with a transverse carrier 50. The latter has two coupling pieces 59 which are provided with conical recesses 51 and arranged at a distance relative to one another. The size of the conical recesses 51 corresponds to the size of the pistons which form the receiving elements 6 and 7 in FIG. 1. The frame 45 is associated with a transmission 64 the drive of saddle unit 21. A torque is supplied to the transmission 60 through a cardan connection 61 from the motor of the carrier vehicle 1. The saddle unit 21 can be placed on the ground after release from the carrier vehicle 1, similarly to the cutting table-threshing unit 15 14 in FIG. 3.

Figure 5:
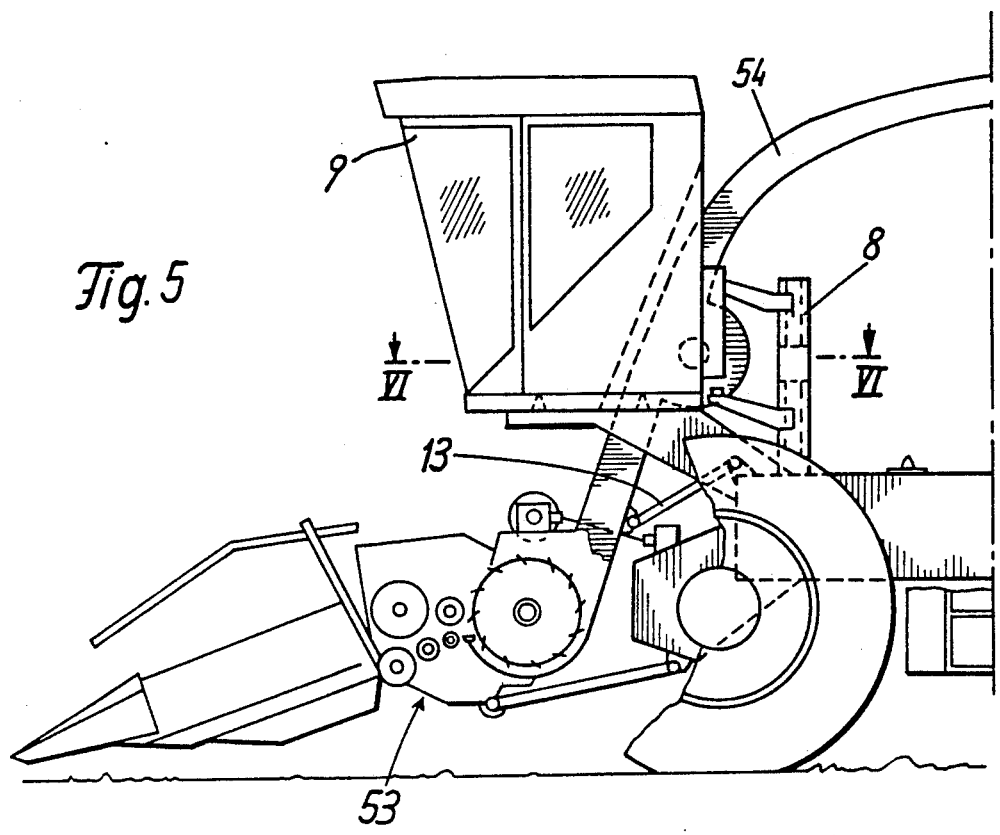
FIG. 5 is a view showing the carrier vehicle provided with a front chopper unit.
Figure 6:
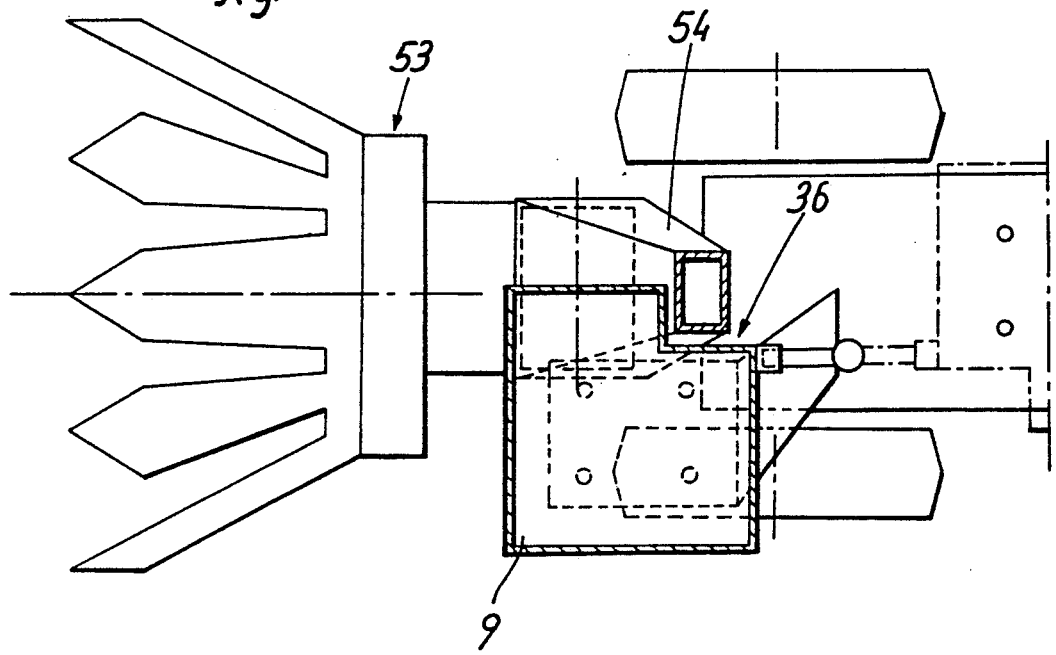
FIG. 6 is a view showing the carrier vehicle of FIG. 5 on a plan view.
Figure 7:
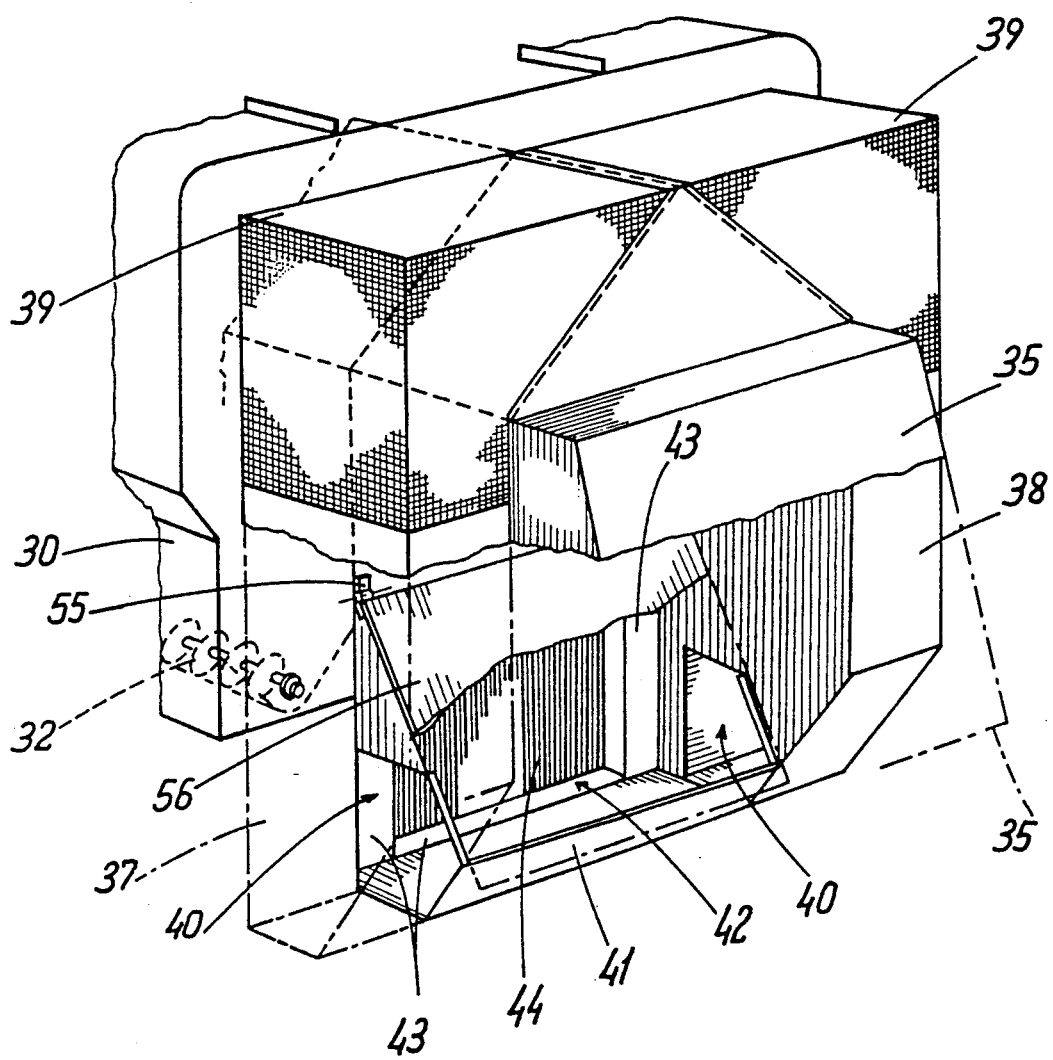
FIG. 7 is a view showing a rear part of the saddle unit with a straw discharge opening and air guiding and filter housings.
Figure 8:
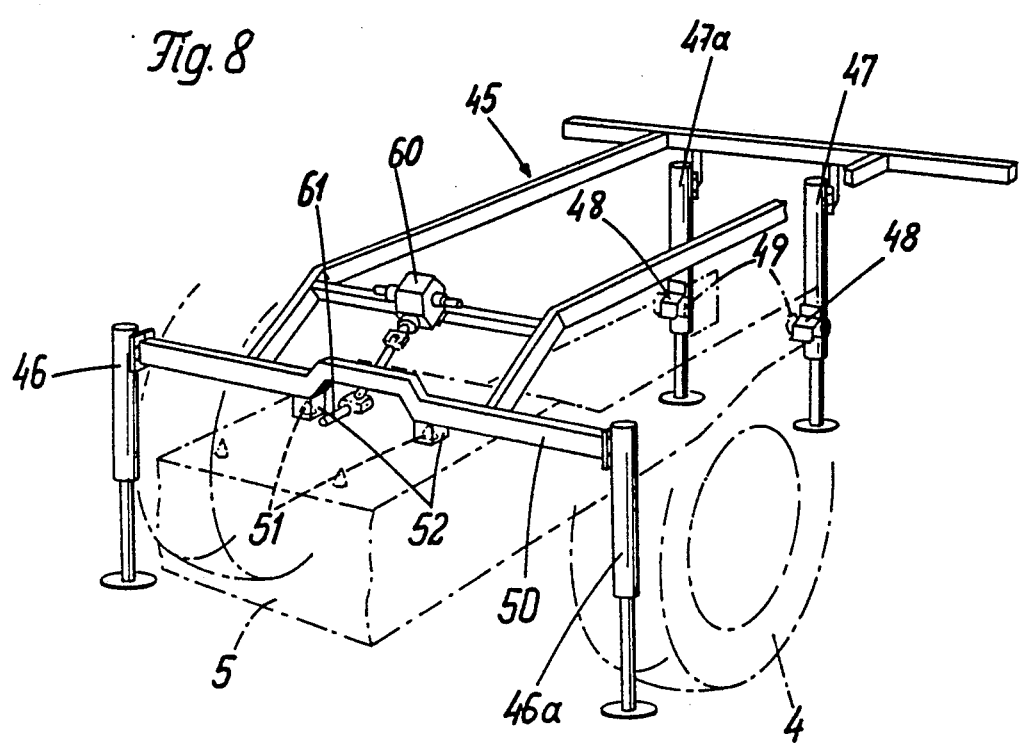
FIG. 8 is a view showing a bearing frame of the saddle unit with four supporting feet.
Figure 9:
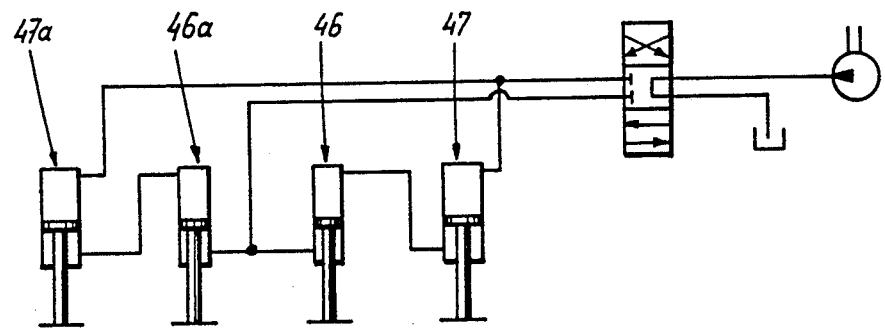
FIG. 9 is a hydraulic diagram for the actuation of the supporting feet of FIG. 4.

FIGS. 5 and 6 show the carrier vehicle 1 with a prearranged chopper unit 53. A centrally arranged discharge pipe 54 of the chopper unit 53 extends through the cutout 36 of the driver's cabin 9. The central upper link 16 is fixedly connected with the wall of the discharge pipe 54.

It will be understood that each of the elements described above, or two or more together, may also find a useful application in other types of constructions differing from the types described above.

While the invention has been illustrated and described as embodied in an agricultural carrier vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An agricultural carrier vehicle, comprising a vehicle; an agricultural aggregate connectable with said vehicle; a saddle unit arranged on said vehicle; a driver's cabin; first clamping means arranged directly on said driver's cabin; second clamping means including at least two clamping devices arranged directly on said vehicle for bracing said driver's cabin in two different positions and engaging with said first clamping means so as to lock the driver's cabin; an upwardly guiding transporting device, said agricultural aggregate and said saddle unit being connectable with said transporting device.

2. An agricultural carrier vehicle as defined in claim 1, wherein said agricultural aggregate includes a cutting mechanism with an axial threshing mechanism.

3. An agricultural carrier vehicle as defined in claim 1, wherein said agricultural aggregate includes a cutting mechanism with a chopping mechanism.

4. An agricultural carrier vehicle as defined in claim 1, wherein said agricultural aggregate includes a picker of beet or potato.

5. An agricultural carrier vehicle as defined in claim 1, wherein said saddle unit is formed as a unit for further processing of an agricultural product.

6. An agricultural carrier vehicle as defined in claim 1, wherein said saddle unit is formed as a collecting unit.

7. An agricultural carrier vehicle as defined in claim 1, wherein said vehicle has a frame provided with said two clamping devices which are arranged directly on said frame of said vehicle in two locations spaced from one another.

8. An agricultural carrier vehicle, comprising a vehicle; an agricultural aggregate connectable with said vehicle; a saddle unit arranged on said vehicle; a driver's cabin; at least two clamping devices arranged for bracing said driver's cabin in two different positions; an upwardly guiding transporting device, said agricultural aggregate and said saddle unit being connectable with said transporting device, said upwardly guiding transporting device being arranged centrally of said vehicle and including two elevators; and a link for connecting said agricultural aggregate to said vehicle and a cardan shaft, said link and said cardan shaft being located in a space between both said elevators.

9. An agricultural carrier vehicle, comprising a vehicle; an agricultural aggregate connectable with said vehicle; a saddle unit arranged on said vehicle; a driver's cabin; at least two clamping devices arranged for bracing said driver's cabin in two different positions; an upwardly guiding transporting device, said agricultural aggregate and said saddle unit being connectable with said transporting device, said transporting device including elevators connected with said saddle unit, said saddle unit having two lateral grain receiving pockets and a cleaning deice located therebetween and transporting an agricultural product to be cleaned to said elevators.

10. An agricultural carrier vehicle as defined in claim 9; and further comprising air guiding shafts extending from above downwardly and connected with both grain receiving pockets rearwardly of the latter; and a chaff throwing hood arranged between said air guiding shafts.

11. An agricultural carrier vehicle as defined in claim 9; and further comprising a motor with a cooler, said air guiding shafts being connected with one another in their lower region by a passage, said passage being provided with an opening connectable with said cooler of said motor.

12. An agricultural carrier vehicle as defined in claim 11; and further comprising a seal through which said opening is connectable with said cooler of said motor, said seal being formed as a bellows.

13. An agricultural carrier vehicle as defined in claim 11; and further comprising a chaff throwing hood, and a separating wall turnably supported about a pivot point between said passage and said chaff throwing hood, said separating wall being formed as a chaff guiding surface of said chaff throwing hood.

14. An agricultural carrier vehicle, comprising a vehicle; an agricultural aggregate connectable with said vehicle; a saddle unit arranged on said vehicle; a driver's cabin; at least two clamping devices arranged for bracing said driver's cabin in two different positions; an upwardly guiding transporting device, said agricultural aggregate and said saddle unit being connectable with said transporting device, said saddle unit having a bearing frame provided hydraulically extendable supporting feet, said bearing frame carrying a transmission for a drive of said saddle unit, said vehicle having a main drive connectable with said transmission through a cardan connection.

15. An agricultural carrier vehicle as defined in claim 14, wherein said supporting feet include four supporting feet which are hydraulically coupled with one another to perform identical strokes, each two of said feet being diametrically hydraulically connected with one another in series and provided with hydraulic cylinder-piston units which are dimensioned so that ring piston surfaces of first one of said cylinder-piston units are equal to piston surfaces of second ones of said cylinder-piston units.

16. An agricultural carrier vehicle, comprising a vehicle; an agricultural aggregate connectable with said vehicle; a saddle unit arranged on said vehicle; a driver's cabin having a cutout; at least two clamping devices arranged for bracing said driver's cabin in two different positions; an upwardly guiding transporting device extending at least partially through said cutout, said agricultural aggregate and said saddle unit being connectable with said transporting device.

17. An agricultural carrier vehicle as defined in claim 16, wherein said transporting device includes an elevator extending at least partially through said cutout of said driver's cabin.

18. An agricultural carrier vehicle as defined in claim 16, wherein said transporting device includes a discharge pipe extending at least partially through said cutout of said driver's cabin.

19. An agricultural carrier vehicle as defined in claim 16, wherein said positions of said driver's cabin include an end position, said cutout in said end position being provided in a rear region of a side of said driver's cabin located near a center of said vehicle.

20. An agricultural carrier vehicle as defined in claim 16, wherein said agricultural aggregate is an axial threshing and separating unit, said transporting device including two elevators arranged near one another, one of said elevators extending through said cutout.

21. An agricultural carrier vehicle as defined in claim 16; and further comprising means for connecting said agricultural aggregate to said vehicle, said connecting means including an upper link articulately connected with a front side of said vehicle, said positions of said driver's cabin having a central position, said links in said central position forming a tractor rear 3-point linkage.

22. An agricultural carrier vehicle as defined in claim 21, wherein said driver's cabin is convertible from one of said receiving elements into the other of said receiving elements after placing said agricultural aggregate in said links.

* * * * *